(12) United States Patent
Maeda et al.

(10) Patent No.: US 6,454,172 B1
(45) Date of Patent: Sep. 24, 2002

(54) IC CARD HAVING A DISPLAY FOR DISPLAYING A RESPONSE STATE

(75) Inventors: Hiroyuki Maeda; Masanori Fujisawa, both of Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/341,116

(22) PCT Filed: Jan. 9, 1998

(86) PCT No.: PCT/JP98/00059
§ 371 (c)(1),
(2), (4) Date: Jul. 7, 1999

(87) PCT Pub. No.: WO98/37510
PCT Pub. Date: Aug. 27, 1998

(30) Foreign Application Priority Data

Feb. 21, 1997 (JP) ............................................. 9-037980

(51) Int. Cl.[7] ............................................. G06K 19/06
(52) U.S. Cl. ....................................... 235/492; 235/487
(58) Field of Search ................................ 235/492, 487, 235/451; 710/1, 5

(56) References Cited

U.S. PATENT DOCUMENTS

| | | | |
|---|---|---|---|
| 4,310,890 A | * 1/1982 | Trehn et al. | 364/467 |
| 4,614,861 A | * 9/1986 | Pavlov et al. | 235/380 |
| 4,717,815 A | * 1/1988 | Tomer | 235/378 |
| 4,749,982 A | 6/1988 | Rikuna et al. | |
| 4,766,293 A | * 8/1988 | Boston | 235/379 |
| 4,868,376 A | * 9/1989 | Lessin et al. | 235/492 |
| 4,930,129 A | * 5/1990 | Takahira | 371/40.4 |
| 4,959,788 A | 9/1990 | Nagata et al. | |
| 5,479,172 A | 12/1995 | Smith et al. | |
| 5,479,637 A | * 12/1995 | Lisimaque et al. | 395/430 |
| 5,585,787 A | * 12/1996 | Wallerstein | 340/825.34 |
| 5,590,038 A | * 12/1996 | Pitroda | 395/241 |
| 5,623,552 A | * 4/1997 | Lane | 382/124 |
| 5,679,939 A | 10/1997 | Watanabe | 235/379 |

(List continued on next page.)

FOREIGN PATENT DOCUMENTS

| | | |
|---|---|---|
| EP | 0 282 926 | 9/1988 |
| JP | 1-189745 | 7/1989 |
| JP | 3-288289 | 12/1991 |
| JP | 4-113489 | 4/1992 |
| JP | 9-114945 | 5/1997 |
| JP | 10-11555 | 1/1998 |
| KR | 1996-5370 | 2/1996 |

OTHER PUBLICATIONS

Korean Office Action for Application No. 10–1999–7006193 dated Aug. 30, 2001.
Canadian Office Action dated Jan. 8, 2002.

*Primary Examiner*—Michael G. Lee
*Assistant Examiner*—Jamara A. Franklin
(74) *Attorney, Agent, or Firm*—Arent Fox Kintner Plotkin & Kahn, PLLC

(57) ABSTRACT

An IC card may externally display a response state in a data communication performed in response to externally applied data. IC card (100) is provided with a data protecting memory (3) for data holding memory (2). An abnormality determination circuit (1) determines how data in data holding memory (2) has been processed. If abnormality determination circuit (1) determines that the externally applied data has been normally written in data holding memory (2), a response state display (7) gives a normal communication completion indication in response to an instruction from a main control circuit (11). Meanwhile, if the presence of an abnormality is determined in the state of writing data, and the data in data holding memory (2) has been recovered using data in data protecting memory (3), response state display (7) gives a data recovery indication. If the recovery of the data is not successful, a communication abnormality indication is made.

9 Claims, 6 Drawing Sheets

U.S. PATENT DOCUMENTS

| | | | | |
|---|---|---|---|---|
| 5,715,431 A | * | 2/1998 | Everett et al. | 395/483 |
| 5,754,762 A | * | 5/1998 | Kuo et al. | 395/186 |
| 5,809,257 A | * | 9/1998 | Shibazaki | 395/287 |
| 5,883,842 A | * | 3/1999 | Miyauchi | 365/200 |
| 5,884,186 A | * | 3/1999 | Hidaka | 455/550 |
| 5,896,325 A | * | 4/1999 | Fijioka | 365/189.07 |
| 5,910,652 A | * | 6/1999 | Kuriyama | 235/492 |
| 5,950,013 A | * | 9/1999 | Yoshimura et al. | 710/5 |
| 6,019,284 A | * | 2/2000 | Freeman et al. | 235/380 |
| 6,036,100 A | * | 3/2000 | Asami | 235/492 |
| 6,047,888 A | * | 4/2000 | Dethloff | 235/380 |
| 6,170,743 B1 | * | 1/2001 | Okaue et al. | 235/380 |

* cited by examiner

IC CARD HAVING A DISPLAY FOR DISPLAYING A RESPONSE STATE

TECHNICAL FIELD

The present invention relates generally to IC cards, and more particularly, to an IC card capable of displaying a response state in a data communication.

BACKGROUND OF THE INVENTION

There have been known IC cards used for a data communication with an externally provided interrogator.

FIG. 6 is a schematic block diagram of the basic configuration of a conventional IC card 300. The conventional IC card 300 as shown is a signal superposing, non-contacting type IC card, supplies power and transmits/receives information using a signal(s) having one or more frequencies received from an interrogator which is not shown.

IC card 300 shown in FIG. 6, an example of an IC card using a single frequency, includes a tuning circuit 15, a rectifying circuit 16, an amplifying/demodulating circuit 17, a modulating/amplifying circuit 18, and an SP/PS conversion circuit 19.

Tuning circuit 15 includes a coil L functioning as an antenna and a capacitor C. Rectifying circuit 16 rectifies a signal received at tuning circuit 15 to generate electric power and supplies the power to each part of IC card 300. Meanwhile, amplifying/demodulating circuit 17 amplifies and demodulates information Q from an interrogator received at tuning circuit 15. A signal output from amplifying/demodulating circuit 17 is SP-converted by SP/Ps conversion circuit 19.

Referring to FIG. 6, this conventional IC card 300 includes a main control circuit 11 and a memory 10.

Main control circuit 11 processes a signal output from SP/PS conversion circuit 19. Data output from main control circuit 11 which is to be held is stored (held) in memory 10 for holding data.

Main control circuit 11 reads out data from an addressed region of memory 10 based on the content of information Q received from the interrogator, and generates response information A based on the read out data. Response information A is PS-converted by SP/PS conversion circuit 19, then processed by modulating/amplifying circuit 18 and transmitted to the interrogator through antenna L.

The response state of such conventional IC card 300 is verified exclusively on the side of the interrogator which is not shown, in other words, conventional IC card 300 does not have a function to verify the response state.

Therefore, information on what is going on in IC card 300 is not available to the side of the user of the card.

For example, if a plurality of IC cards 300 perform a data communication simultaneously or sequentially without time interval, and a response abnormality from any of IC cards 300 is detected on the side of interrogator, the user cannot find which IC card 300 has the abnormality in the data communication.

Thus, the reliability of the entire system including the interrogator and the responding element (IC card) can be hardly secured.

It is therefore an object of the present invention to provide an IC card permitting the user to recognize a response state in a data communication.

Another object of the invention is to provide an IC card capable of continuously displaying a response state in a data communication for a prescribed time period.

DISCLOSURE OF THE INVENTION

An IC card according to the present invention performs a data communication in response to externally applied data, and includes a control circuit to control data reception and a response, and a display to display a response state in response to an instruction from the control circuit.

An IC card according to another aspect of the invention performs a data communication in response to externally applied data, and includes a storing circuit to which the externally applied data is written, a control circuit to control a response using the data written in the storing circuit, and a display to display a response state in response to an instruction from the control circuit.

An IC card according to a further aspect of the invention performs a data communication in response to externally applied data, and includes a first storing circuit to which the externally received data is written, a second storing circuit to save the written data in the first storing circuit, a control circuit to make control for making a response using data in the first or second storing circuit, and a display circuit to display a response state in response to an instruction received from the control circuit.

Therefore, a main advantage of the present invention resides in that the user may readily visually recognize a response state in a data communication.

BEST MODE FOR CARRYING OUT THE INVENTION

First Embodiment

An IC card according to a first embodiment of the invention has a displaying function and can externally display the response state of the IC card in a data communication based on the state of writing data in a memory for holding data.

Figure 1:
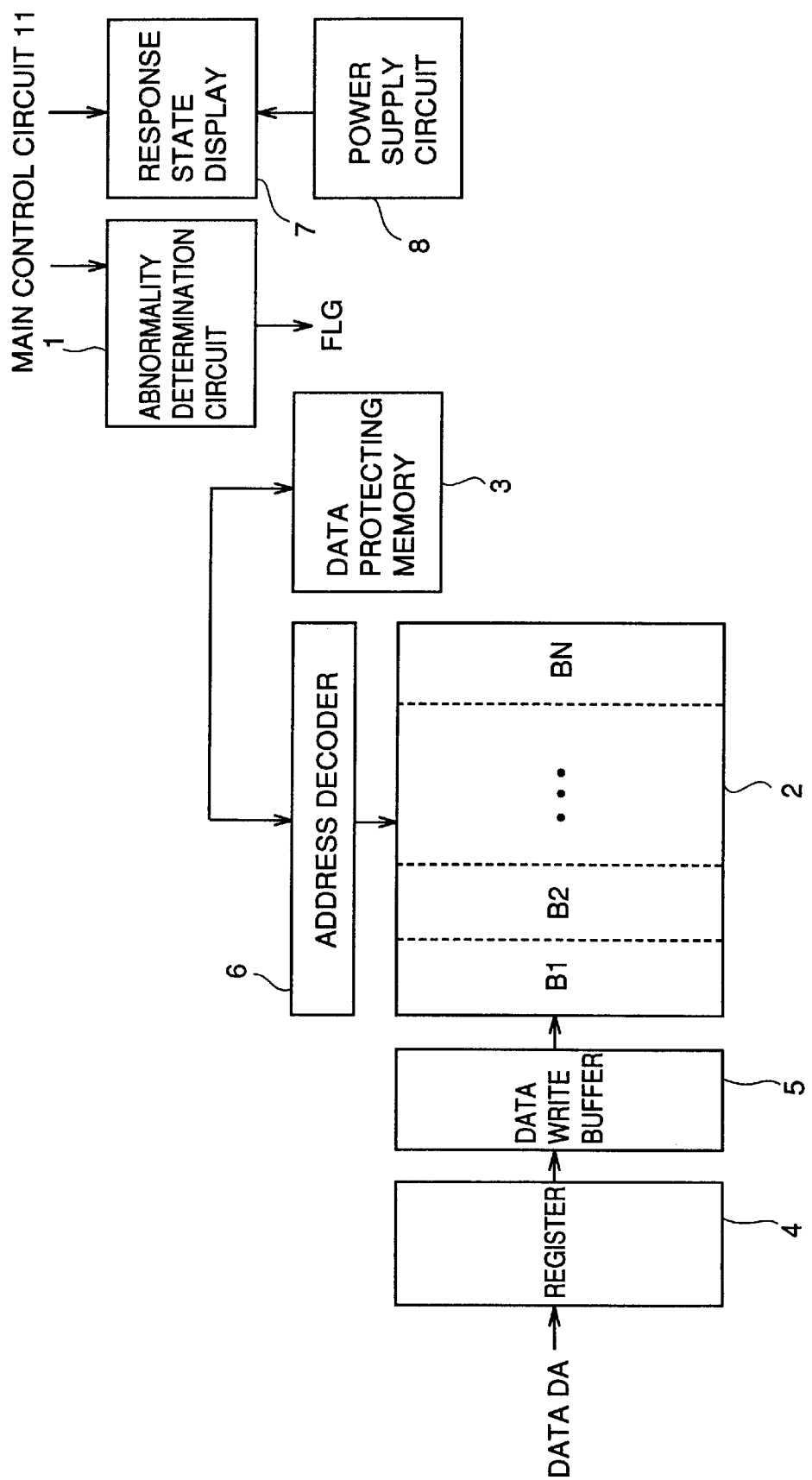
FIG. 1 is a block diagram of the configuration of a main part of an IC card 100 according to a first embodiment of the present invention.
Figure 6:
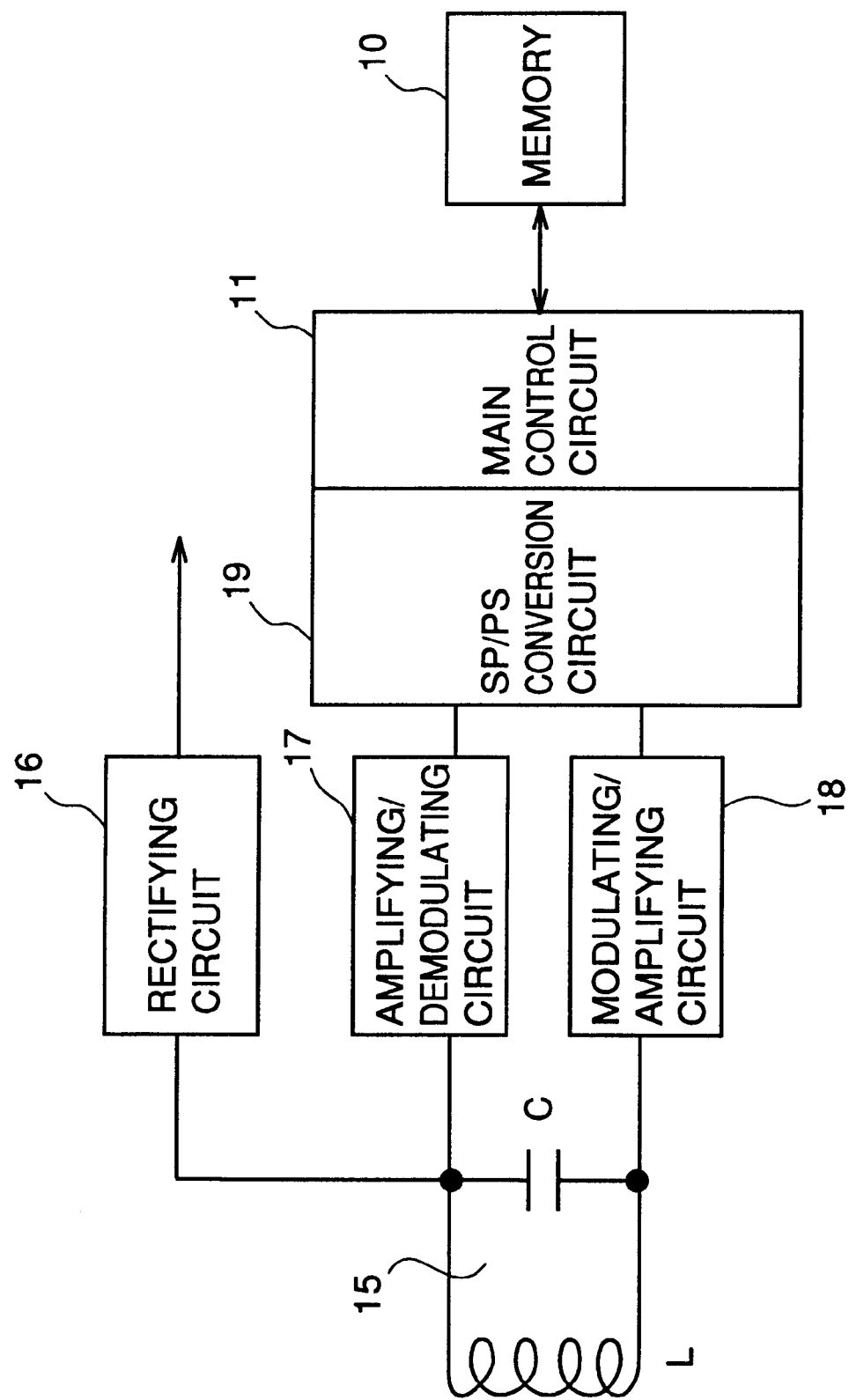
FIG. 6 is a schematic block diagram of the configuration of a conventional IC card 300.

FIG. 1 is a block diagram of the configuration of a main part of IC card 100 according to the first embodiment, and the remaining part is the same to that of the conventional IC card 300 shown in FIG. 6 (except for memory 10), and therefore the remaining part is not shown and described. Note that the IC card to which the present invention is applied may be a contacting type or non-contacting type IC card.

IC card 100 shown in FIG. 1 is different from IC card 300 as follows. IC card 100 includes a non-volatile memory for holding data 2 (hereinafter data holding memory 2) and a non-volatile memory for protecting data 3 (hereinafter data protecting memory 3) in place of memory 10, an abnormality determination circuit 1 to determine the state of writing data in data holding memory 2, a response state display 7 to display a response state, and a power supply circuit 8 to supply power to response state display 7 for a prescribed time period.

Referring to FIG. 1, the configuration of IC card 100 according to the first embodiment will be now described.

A register 4 receives data DA to be held, received in the present data communication from main control circuit 11 shown in FIG. 6. Register 4 may be formed by an SRAM. A data write buffer 5 is a circuit to write data in register 4 into data holding memory 2. An address decoder 6 is a circuit to address a region of data holding memory 2 to/from which a data writing/reading operation is performed.

Data holding memory 2 stores data DA received from register 4. Referring to FIG. 1, data holding memory 2 according to the first embodiment stores data DA received by a single data communication in any of regions B1, B2, ..., BN under the control of main control circuit 11. A non-volatile device such as flash memory is used for data holding memory 2.

IC card 100 according to the first embodiment performs a data communication based on data stored in data holding memory 2. Therefore, if there is an abnormality in data holding memory 2, an abnormality occurs in a data communication.

Data protecting memory 3 serves to save data stored in data holding memory 2 and is used to recover the data in data holding memory 2 when the data is destroyed. Referring to FIG. 1, data protecting memory 3 according to the first embodiment includes a capacity for storing data DA received in a single data communication (not less than the capacity of region B1, B2, ..., or BN). A non-volatile device such as flash memory is used for data protecting memory 3.

Note that data to be written in data protecting memory 3 needs only correspond to the content stored in data holding memory 2 on a one-to-one basis, and the data may be the inverse of data in data holding memory 2.

Abnormality determination circuit 1 determines the state of writing data in data holding memory 2 based on an instruction from main control circuit 11, and records the result of determination in a state determination flag FLG for output. For example, if there is an abnormality in the power supply at the time of writing data, the data could be irregularly altered, and therefore abnormality determination circuit 1 according to the first embodiment determines the state of writing data in data holding memory 2 based on the state of the power supply to operate IC card 100.

As will be described, state determination flag FLG has its value updated depending upon how data is processed. If data DA to be held in data holding memory 2 is stored, state determination flag FLG is initialized. (The state of writing data is determined normal.) Meanwhile, if an abnormality occurs in the process of writing data DA in data holding memory 2, state determination flag FLG is not initialized regardless of the following processes, and the value at the occurrence of the abnormality is held. (The state of writing data is determined abnormal.)

Note that the value of state determination flag FLG is held until the next data communication processing. State determination flag FLG may be formed for example by a non-volatile memory.

Response state display 7 receives an instruction from main control circuit 11 and displays information related to the response state of IC card 100. More specifically, the display indicates the following contents according to state determination flag FLG. First, if the state of writing data into data holding memory 2 is normal, an indication that a normal response has been completed (normal communication completion indication) is given. Secondly, when the state of writing data into data holding memory 2 is abnormal, but the data has been recovered using data in data protecting memory 3, an indication that the data has been recovered (data recovery indication) is given. Thirdly, when the state of writing data in data holding memory 2 is abnormal and there is no recovery data in data protecting memory 3, an indication that the response has been abnormal (communication abnormality indication) is given.

Power supply circuit 8 supplies power to response state display 7 for a prescribed time period. Response state display 7 receives the power supplied from power supply circuit 8 and continuously displays the response state for a prescribed time period. Power supply circuit 8 may be for example a circuit formed of a large capacity capacitor receiving current from rectifying circuit 16 shown in FIG. 6, or a circuit including a storage cell or a solar cell.

The operation of IC card 100 according to the first embodiment will be now described.

Figure 2:
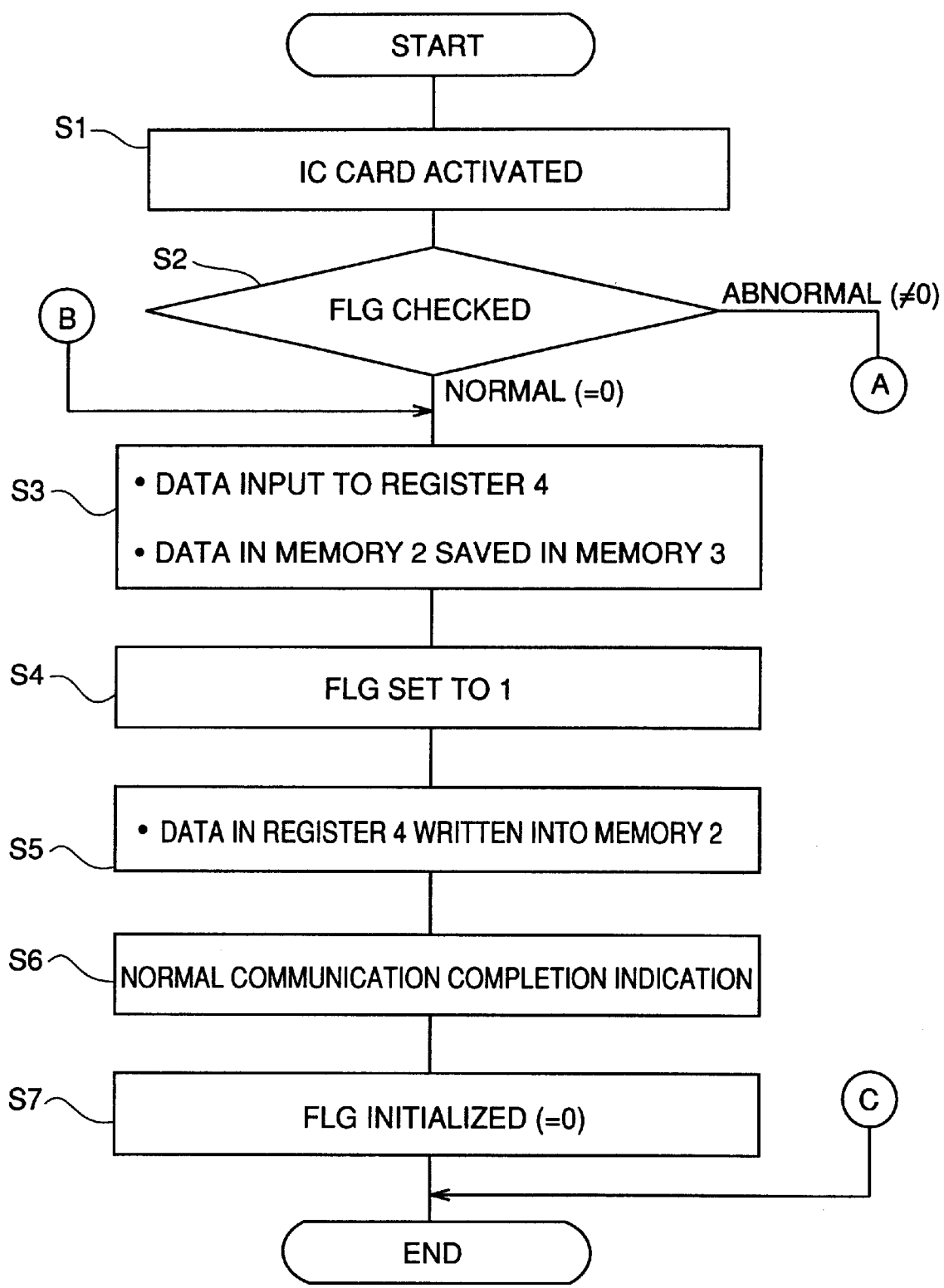
FIGS. 2 and 3 give a flow chart for use in illustration of data holding and data recovery operations and a response state display in IC card 100 according to the first embodiment.
Figure 3:
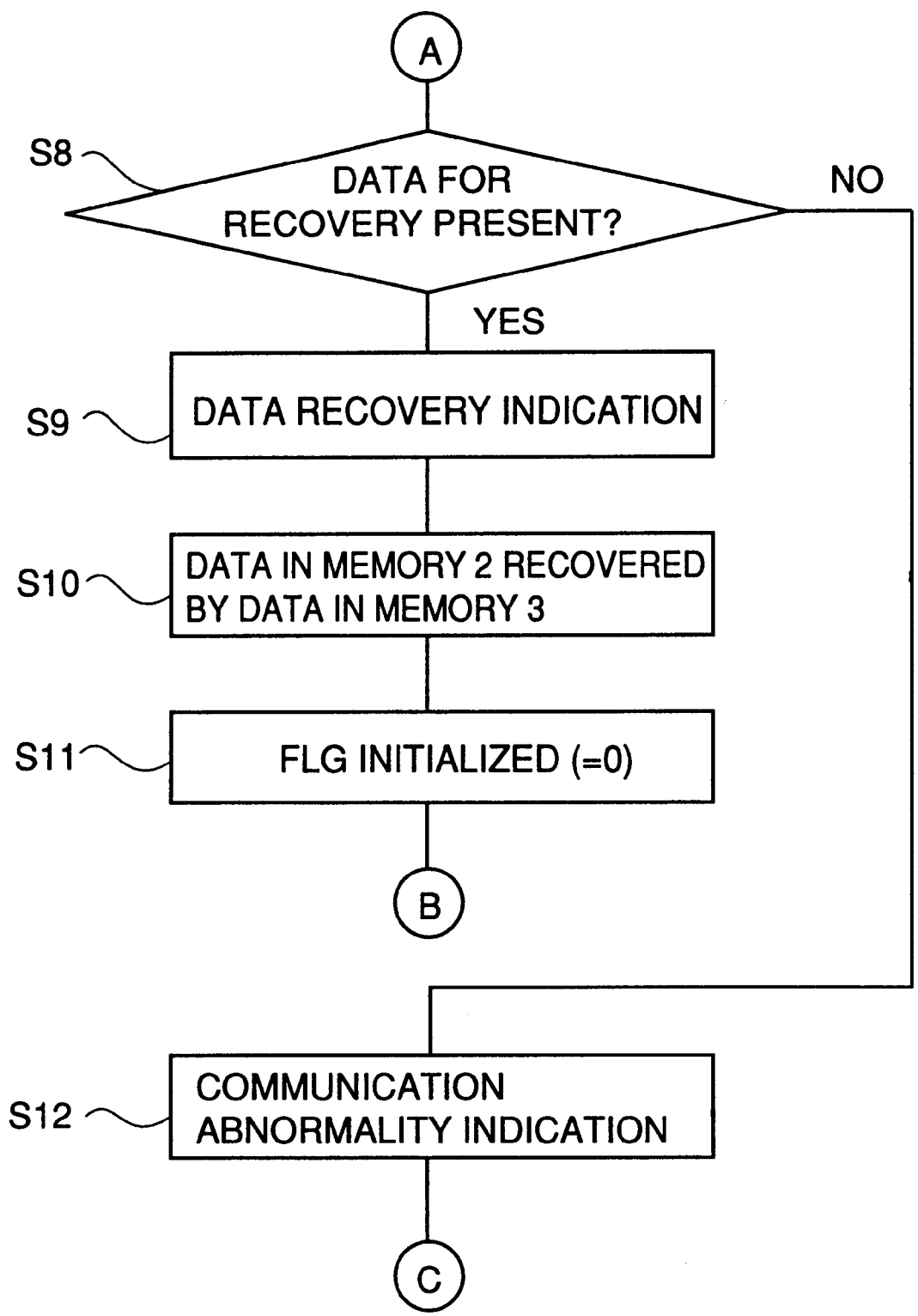

FIGS. 2 and 3 are flow charts each for use in illustration of operations related to data holding and recovery operations by IC card 100 according to the first embodiment. Herein, state determination flag FLG takes 0 or 1, and the value is initialized to 0 if the state of writing data is normal.

Referring to FIGS. 2 and 3, the data holding and recovery operations and display of a response state by IC card 100 will be now described.

In step S1, the IC card is activated.

In step S2, state determination flag FLG is checked, and it is determined if data has been normally written in data holding memory 2 (=0).

The case in which state determination flag FLG takes 0, in other words when the state of writing data in data holding memory 2 is normal will be described.

Note that, although not illustrated, in the process of steps S3 to S5 except for the period of writing to data holding memory 2, IC card 100 performs a data communication using data in data holding memory 2.

In step S3, data DA is input to register 4. Data in region B1 in data holding memory 2 is then read out and the read out data is saved (written) in data protecting memory 3. In step S4, state determination flag FLG is set to 1 (to the state in which data in region B1 in data holding memory 2 has been saved in data protecting memory 3). In step S5, data DA written in register 4 is written in region B1 in data holding memory 2.

After the processing of step S5 (in the state in which data DA has been written in data protecting memory 2), response state display 7 gives a normal communication completion indication in step S6. Then in step S7, state determination flag FLG is initialized (=0).

Subsequently, the case in which state determination flag FLG takes 1, in other words, when the state of writing data in data holding memory 2 is abnormal will be now described.

Note that, although not illustrated, the following process is executed after IC card 100 starts to be activated and before accessing to data holding memory 2 is initiated.

It is checked in step S8 if data necessary for recovering data in data holding memory 2 is present in data protecting memory 3. If no such data is present (such as in the first communication in which no data is present in data protecting memory 3), a communication abnormality occurs, and therefore response state display 7 gives a communication abnormality indication in step 12.

Meanwhile, if there is data for recovery, response state display 7 gives a data recovery indication in step S9. In step S10, data which has been saved in data protecting memory 3 is read out, and the data is written in region B 1 in data holding memory 2. As a result, the data causing a communication abnormality is destroyed, and normal data is written (recovered) in data holding memory 2. After the recovery process in step S10 is completed, state determination flag FLG is initialized (=0) in step S11. After a normal state is attained in step S1, the process in steps S3 to S6 is performed.

Figure 4A:
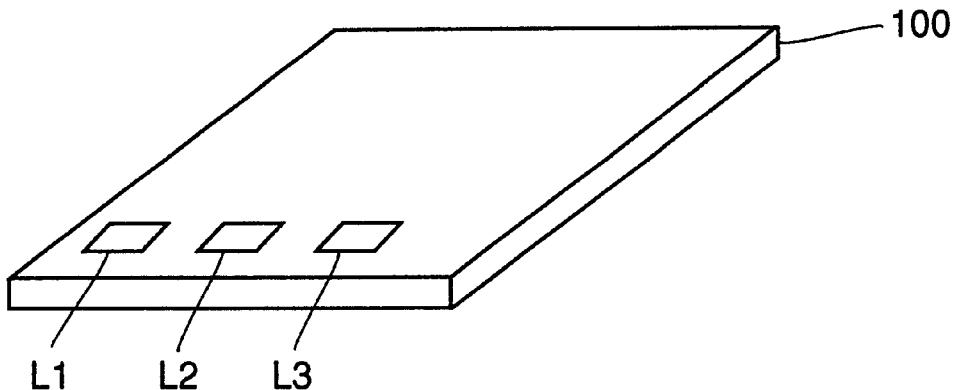
FIGS. 4A to 4C are views each showing an overview of IC card 100 according to the first embodiment.
Figure 4B:
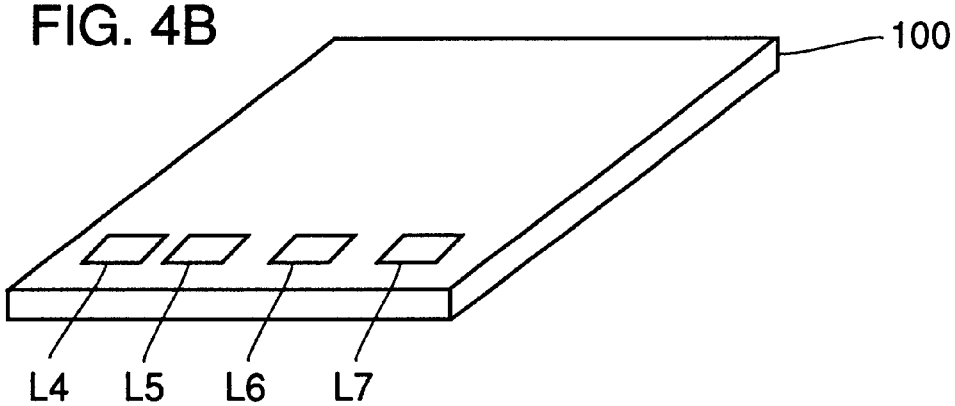
Figure 4C:
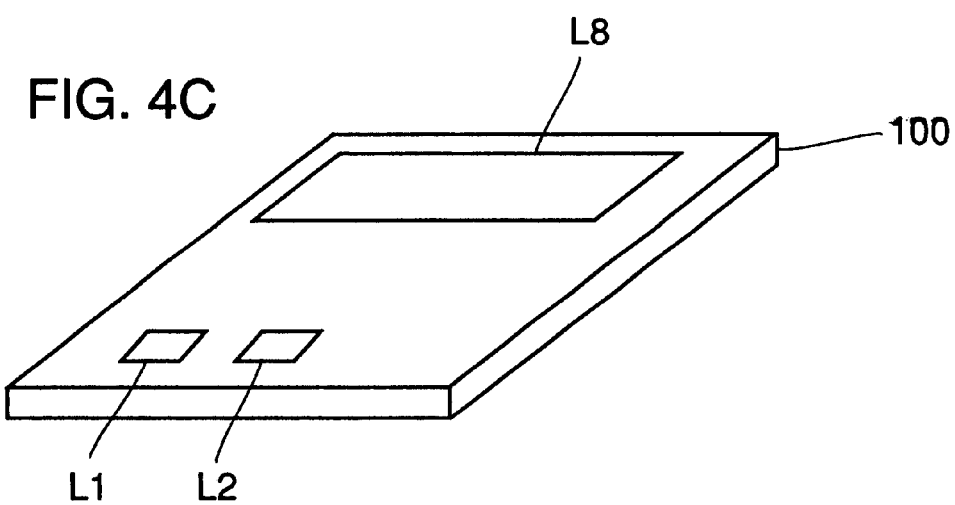

FIGS. 4A to 4C are views each showing an overview of IC card 100 according to the first embodiment. As shown in FIG. 4A, for example, response state display 7 may be formed using an LED (L1, L2, and L3 in FIG. 4A). For example, L1, L2, and L3 in FIG. 4A may correspond to the normal communication indication, data recovery indication, and communication abnormality indication, respectively. Alternatively, the use of LEDs of two colors makes it easier for the user to visually recognize the normal communication indication and the communication abnormality indication.

The content of display is not limited to the above, and other communication contents (L4, L5, L6, and L7 in FIG. 4B) may be indicated.

Alternatively, response state display 7 may be formed by an LCD or by both an LCD (L8 in FIG. 4C) and an LED (L1, L2 in FIG. 4C).

As described above, IC card 100 has a display function, may determine the state of writing data in data holding memory 2, and use the result of determination to externally display the response state of IC card 100 in a data communication.

Second Embodiment

An IC card according to a second embodiment of the invention externally displays the response state of the IC card in a data communication using a main memory or a sub memory for holding data.

According to the second embodiment, not only an abnormality in the power supply but also change in data caused by externally imposed stress, or static electricity may be detected.

Figure 5:
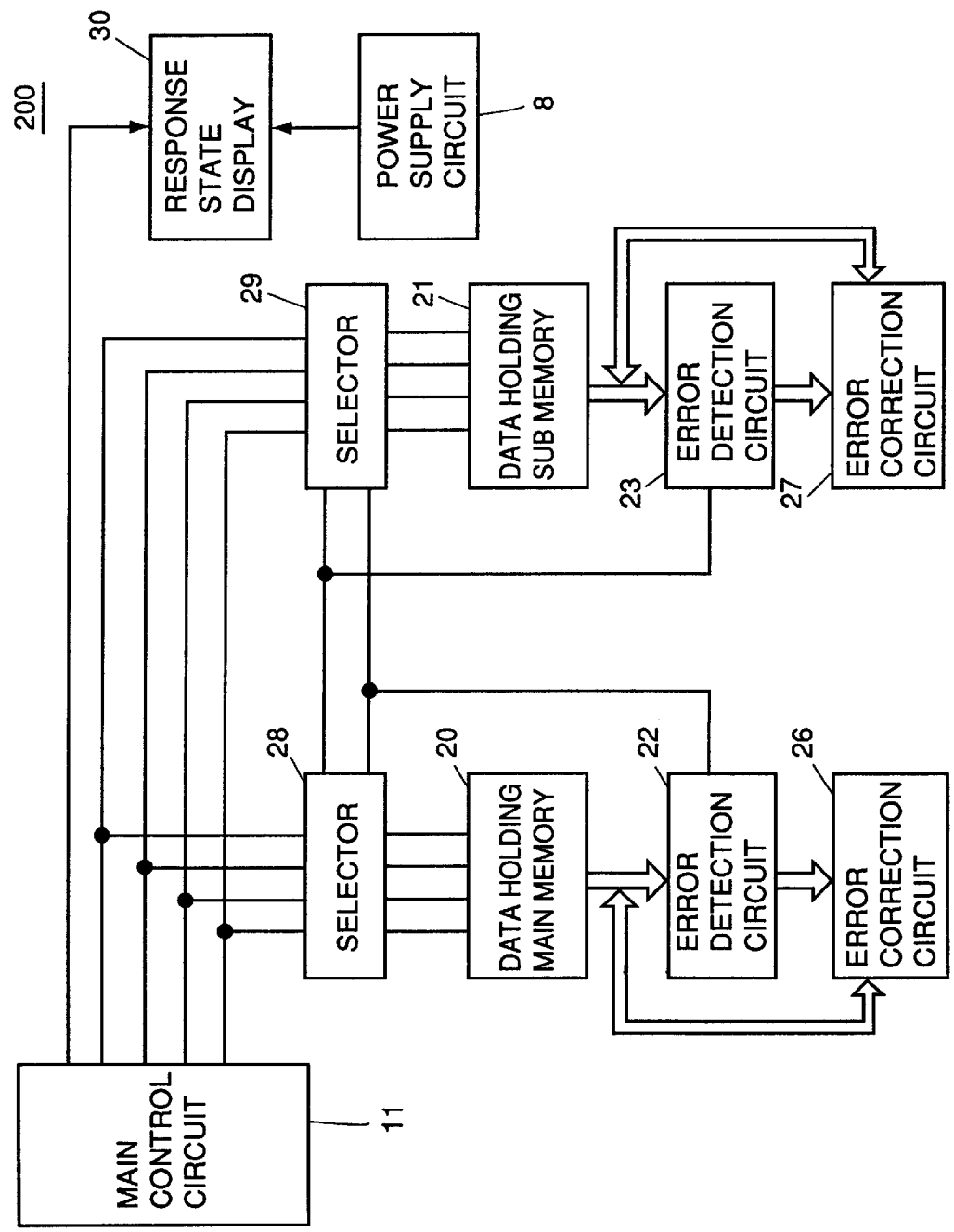
FIG. 5 is a block diagram of the configuration of a main part of an IC card 200 according to a second embodiment of the present invention.

FIG. 5 is a block diagram of the configuration of a main part of an IC card 200 according to the second embodiment, and the remaining part is the same as that of the conventional IC card 300 shown in FIG. 6 (except memory 10) and therefore is not shown or described. The card to which the invention is applied may be a contacting type or non-contacting type IC card.

IC card 200 shown in FIG. 5 is different from the conventional IC card 300 in the following points. IC card 200 includes a non-volatile main memory for holding data 20 (hereinafter simply as main memory 20) and a non-volatile sub memory for holding data 21 (hereinafter simply as sub memory 21) in place of memory 10, detection circuits 22 and 23 for detecting errors in main memory 20 and sub memory 21, respectively, a response state display 30 for displaying a response state, and a power supply circuit 8 for supplying power to response state display 30 for a prescribed time period.

Referring to FIG. 5, the configuration of IC card 200 according to the second embodiment will be described.

Main memory 20 and sub memory 21 are connected to a main control circuit 11 through selectors 28 and 29, respectively.

Sub memory 21 is used as a backup memory for main memory 20, and data corresponding on a one-to-one basis to data in main memory 20 is written in this sub memory. Note that the data written in sub memory 21 may be the inverse of data written in main memory 20, or data complementary to the data written in main memory 20.

Main memory 20 and sub memory 21 may be formed by an EEPROM, a flash memory, a ferroelectric memory or the like.

Error detection circuits 22 and 23 detect errors in data written in main memory 20 and sub memory 21, respectively. Error detection circuits 22 and 23 control selectors 28 and 29 based on the result of detection. As a result, a memory (main memory 20 or sub memory 21) which allows main control circuit 11 to read out data is selected.

Error detection circuits 22 and 23 may be a parity check circuit, a CRC check circuit or the like. Errors may be detected on a one-bit-basis or a multi-byte-basis.

Error correction circuits 26 and 27 correct errors detected by error detection circuits 22 and 23, respectively.

Response state display 30 receives an instruction from main control circuit 11 and gives an indication related to the response state of IC card 200. More specifically, the indication is switched depending upon the error detection about main memory 20 and sub memory 21. Response state display 30 may be formed by an LCD or LED as described in connection with the first embodiment of the invention.

Power supply circuit 8 supplies power to response state display 30 for a prescribed time period as described in connection with the first embodiment.

The operation of IC card 200 according to the second embodiment will be now described.

When main control circuit 11 receives data from an interrogator, main control circuit 11 has data DA stored in main memory 20 and sub memory 21 through selectors 28 and 29, respectively.

Error detection circuit 22 detects the presence/absence of an error in the data stored in main memory 20. If an error is not detected in the data in main memory 20, error detection circuit 22 controls selector 28 such that the data is to be read out to main control circuit 11 from main memory 20, and controls selector 29 such that data is not to be read out from sub memory 21. Meanwhile, if an error is detected in the data in main memory 20, control circuit 11 controls selector 28 such that the data is not to be read out from main memory 20 and controls selector 29 such that data is to be read out from sub memory 21.

Error detection circuit 23 detects the presence/absence of an error in the data stored in sub memory 21. If an error is detected in sub memory 21 as well as in main memory 20, data is not provided from main memory 20 and sub memory 21 to main control circuit 11. In this case, main control circuit 11 requests the interrogator to re-transmit the data or clearly indicates the presence of the error. If an error is detected, error correction circuits 26 and 27 read out data from main memory 20 or sub memory 21 and then correct the data.

Response state display 30 makes a normal communication completion indication when data is read out from main memory 20 or sub memory 21 and gives a communication abnormality indication when no data is read out from any of memories 20 and 21.

Response state display 30 may give a normal communication completion indication when data is read out from main memory 20, a backup indication when data is read out from sub memory 21, and a communication abnormality indication when no data is read out from any of memories 20 and 21.

Note that errors in data only in main memory 20 may be detected by error detection circuit 22 without providing error detection circuit 23. In this case, response state display 30 needs only be adapted to give a normal communication indication and a communication abnormality indication.

As described above, IC card 200 having a display function may detect errors in data in main memory 20 and sub memory 21 and may externally display the response state of IC card 200 in a data communication based on the result of detection.

As in the foregoing, an IC card according to the present invention has a display function and may externally display a response state in a data communication using the result of determination of the state of writing data.

Furthermore, with the power supply function, the response state may be continuously displayed for a prescribed time period.

As a result, the reliability of the IC card may be improved.

What is claimed is:

1. An IC card responsive to externally applied data for performing a data communication, comprising:

first storing means into which said externally applied data is written;

second storing means for saving said data written in said first storing means;

control means for making a control for a response using said data in said first storing means, or said second storing means, and display means for displaying a response state in response to an instruction from said control means;

wherein said control means includes, determination means for determining whether a state of writing said data in said first storing means is normal; and recovery means for recovering a content in said first storing means using said data in said second storing means, in response to an abnormality determination by said determination means, said display means for displaying that said response state is normal if said determination means makes a normality determination, that said data is recovered if said determination means makes an abnormality determination and a recovery processing is performed in said recovery means, and that said response state is abnormal if said determination means makes an abnormality determination and a recovery processing is not successful in said recovery means.

2. An IC card responsive to externally applied data for performing a data communication, comprising:

first storing means into which said externally applied data is written;

second storing means for saving said data written in said first storing means;

control means for making a control for a response using said data in said first storing means, or said second storing means, and display means for displaying a response state in response to an instruction from said control means;

wherein said control means includes, first determination means for determining whether a state of writing said data into said first storing means is normal or abnormal;

second determination means for determining whether a state of writing said data into said second storing means is normal or abnormal;

first recovery means for recovering a content in said first storing means in response to an abnormality determination by said first determination means; and second recovery means for recovering a content in said second storing means in response to an abnormality determination by said second determination means, said display means for displaying the state of said data communication in response to a result of determination by said first determination means, a result of determination by said second determination means, a result of recovery by said first recovery means and a result of recovery by said second recovery means.

3. The IC card as recited in claim 1 or 2, further comprising power supply means for supplying power to said display means for a prescribed time period so that an indication in said display means is continued for a prescribed time period.

4. The IC card as recited in claim 3, wherein said display means includes any of an LCD and an LED.

5. The IC card as recited in claim 3, wherein said power supply means includes a capacitor.

6. The IC card as recited in claim 3, wherein said power supply means includes a battery.

7. The IC card as recited in claim 3, wherein said power supply means includes a solar cell.

8. The IC card as recited in claim 1, wherein said display means includes any of an LCD and an LED.

9. The IC card as recited in claim 2, wherein said display means includes any of an LCD and an LED.

* * * * *